United States Patent [19]
Sessions

[11] 4,043,131
[45] Aug. 23, 1977

[54] OIL SLICK RETAINING BOOM FOR OFF-SHORE OIL WELLS

[76] Inventor: Byron J. Sessions, 4939 Havasu Way, Salt Lake City, Utah 84120

[21] Appl. No.: 675,253

[22] Filed: Apr. 9, 1976

[51] Int. Cl.² ............................................. E02B 15/04
[52] U.S. Cl. ................................ 61/1 F; 210/DIG. 25
[58] Field of Search .......................... 61/1 F, 1 R, 3–5; 210/242, DIG. 25, DIG. 26

[56] References Cited

U.S. PATENT DOCUMENTS

| 3,577,879 | 5/1971 | Ducrocq | 61/1 F |
| 3,667,235 | 6/1972 | Preus et al. | 61/1 F |
| 3,792,589 | 2/1974 | Sayles | 61/1 F |
| 3,906,732 | 9/1975 | Tedeschi | 61/1 F |
| 3,943,720 | 3/1976 | Milgram | 61/1 F |

FOREIGN PATENT DOCUMENTS 1,537,170   7/1968   France ................................ 61/1 F Primary Examiner—Dennis L. Taylor Attorney, Agent, or Firm—K. S. Cornaby

[57] ABSTRACT

An oil-retaining boom structure for disposition upon a body of water, preferably surrounding an off-shore oil well has a plurality of bouyant float members movably connected together by a connecting cable which extends through the body structure of each float member. Each float member comprises an elongate housing having weights disposed in one end thereof adapted to retain that housing end downward in the water. The floats are interconnected with each other through the connecting cable with washer means surrounding the cable between the adjacent floats. The washer means preferably have grooved means surrounding the circumference of the washer to accommodate elongate rods which can be used to retain portions of the boom in parallel relationship if desired to form a channel for the oil within the boom. The floats have sheet means attached to at least one side thereof extending along the boom to retain the oil on one side of the sheet means as the boom rides at or near the surface of the water.

8 Claims, 5 Drawing Figures

U.S. Patent
Aug 23, 1977
4,043,131
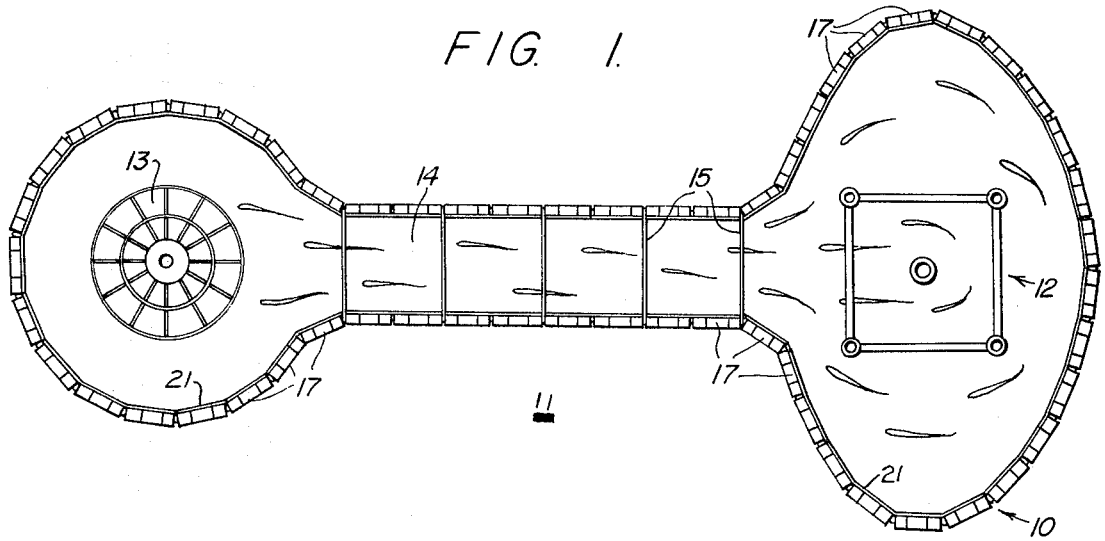
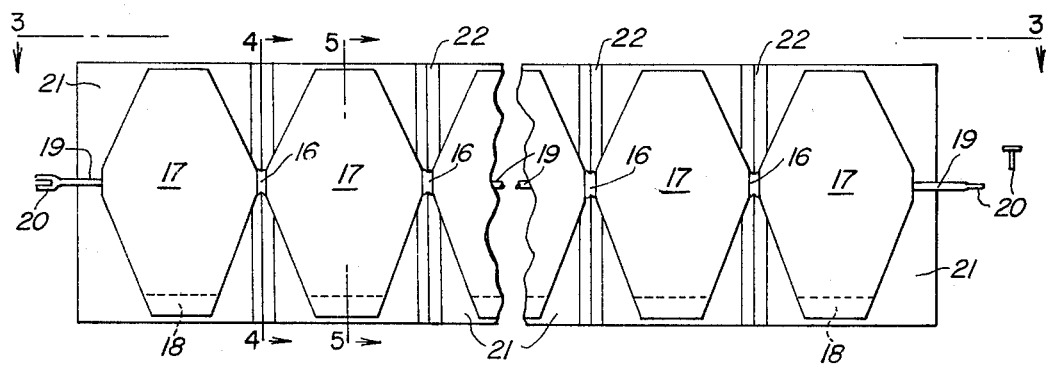
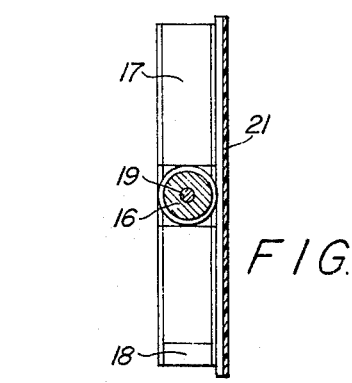
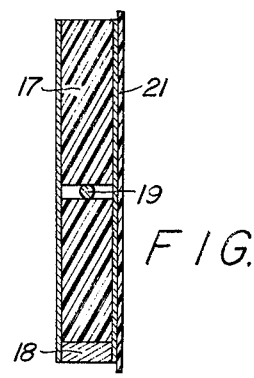

OIL SLICK RETAINING BOOM FOR OFF-SHORE OIL WELLS

BACKGROUND OF THE INVENTION

There are many prior art oil-retaining boom structures for use on bodies of water, such as seas, lakes, oceans and gulfs. They are adjusted to encircle oil slicks emanating from oil spills from oil tankers, off-shore wells and other oil-producing sources on bodies of water. Typically, such prior art booms are transported to the site of the oil slick after oil spillages have occurred, and it becomes necessary to encircle or confirm the oil within a definite area or to prevent the oil from spreading to adjacent areas, such as nearby beaches, bays, water channels and the like.

Other objectives will become evident from the description of the invention which follows.

SUMMARY OF THE INVENTION

An oil-retaining boom means adapted particularly for use surrounding off-shore oil wells and drilling rigs to retain oil spillages and surface oil slicks within the boom has a plurality of float means moveably interconnected in side-by-side relationship by connecting cable means. The boom means is adapted to float at or near the surface of water and has a continuous sheet member attached to the floats so that the flat surface of the sheet member is held perpendicular to the surface of the water, thereby enabling the sheet member to retain oil on one side thereof. The individual floats are buoyant and have an elongate structure, preferably hexagonal, with weights at one elongate end adapted to retain that elongate end downwardly in the water so as to provide stability and an upright relationship of the float with the water surface.

Washer type spacers having preferably an indentation about the circumference thereof in a pully-like manner, are disposed about the connecting cable intermediate between the floats. Spacer bars are preferably provided which connect at each end thereof over the washer spacers and hold the boom structure in parallel relationship to form a channel therein through which oil can flow from the oil well to an oil pick-up barge or other apparatus for removing oil from water surfaces, such as is disclosed in my co-pending application for apparatus for removing oil from water surfaces.

To date there have been no oil-retaining booms produced which are adapted especially for surrounding existing oil wells in off-shore locations to prevent rapid dispersal of oil away from the oil well or drilling rig if a blow out occurs at the well or drilling rig. One of the major problems encountered in blowouts of off shore wells is the rapid discharge of oil from the well immediately following the blow-out. In many instances, hundreds of thousands of gallons of oil can be discharged onto the body of water in a few short hours and can build up a layer of oil well over one to two feet in depth. The prior art booms are intended to be transported to the spills after oil spillage occur, which is in virtually all instances too late to effectively contain the surface oil. Moreover, the booms are not adapted to contain oil of any significant depth. Oil depths of over one or two inches on the surface of the water cannot be contained by these booms. Likewise, in the event of oil fires, which not uncommonly accompany oil well blow-outs in off-shore sites, the booms are not fire-resistant and are consumed or rendered inoperable for the purpose of containing the oil spillages.

OBJECTIVES

It is an objective of this invention to provide an oil boom which can be disposed about an off-shore oil well or drilling rig, as well as in other bodies of water, prior to an oil blow-out or other oil spillages, slo that in the event of an oil spillage, the oil is entirely contained within the encircling boom.

It is a further objective to provide a boom structure for containing relatively deep concentrations of oil on the surface of a body of water.

A further objective is to provide a boom structure which is resistant to an oil fire and which can retain the majority of the oil even if parts of the boom structure are damaged by fire.

THE DRAWINGS

The best mode presently contemplated for carrying out the invention is illustrated in the accompanying drawings, in which:

FIG. 1 represents a perspective view of the oil retaining boom surrounding an off-shore oil well and forming a channel for moving the oil slick away form the oil well to an oil removing device located at the other end of the boom;

FIG. 2, a side elevation of the boom showing the individual floats interconnected through the cable and having the sheet member attached thereto;

FIG. 3, a top plan view of a portion of the boom taken along line 3—3 of FIG. 2;

FIG. 4, a side elevational section of the boom showing a float as taken along line 4—4 of FIG. 2, and FIG. 5, a side elevational section of a float taken along the line 5—5 of FIG. 2.

DETAILED DESCRIPTION OF THE ILLUSTRATED EMBODIMENT

As shown in FIG. 1, a preferred embodiment of the invention comprises an oil-retaining boom 10 disposed on a body of water 11 around an off-shore oil well and drilling rig 12. The configuration of boom 10 is roughly that of a bar-bell, in that one end of boom 10 encircles the oil well 12 and the other end encircles an oil slick removing device 13 as shown, for example, in my co-pending patent application.

The channel 14 formed by the boom 10 between the well 12 and the oil removing device 13 is constructed by means of one or more elongate retaining rods 15 which extend from one parallel boom portion to the opposite boom portion holding the boom in a parallel channel position as shown.

Rods 15 have curved ends (not shown) adapted to be secured over the channelized portions of washers 16 disposed between adjacent floats 17, as shown in detail in FIGS. 2 and 3. Since the rods are most likely to be under water when in place, they are preferably constructed of non-corrosive metal or other materials having similar properties.

Channel 14 serves more than one purpose. It can guide the oil flow from the well 12 to oil removal apparatus 13 as the boom 10 is tightened in ever-smaller area around well 12. But the channel more importantly serves to provide a means for removing oil from around the well in the event the oil has been ignited and is being consumed in a sheet of flame. The oil can be moved along the channel 14 and the flames doused with water sprayed from a barge standing along side (not shown) as the fire moves into channel 14. Other means, not shown, can be employed to quench the fire such as a series of asbestos "blankets" draped over rods 15, permitting the oil to flow beneath them, but cutting off the flames at the mouth or within the channel 14. Thus, a singularly dangerous and costly aspect of oil well blowouts can be brought under control and/or elminated.

As illustrated in FIGS. 2, 3, 4 and 5, the boom comprises a series of floats 17, preferably in elongate hexagonal shape, disposed adjacent each other in side-by-side relationship and adapted to float in water. They can be constructed of plastic, wood, cork or similar meterial, but preferably are constructed of non-corrosive metal or having a non-corrosive metal cap or covering. The purpose is to prevent damage or destruction by fire in the event of an attendant fire to the oil spill.

The bottom portion of the float 17 has weights 18 which can be adjusted at time of manufacture or later to determine the depth at which floats 17 will ride in the water. Preferably, about two or two and one-half feet of float 17 ride above the water and about four feet below to permit rather deep concentrations of oil on the water's surface with boom 10. Weights 18 also serve to maintain the floats in a perpendicular relationship with the water surface.

Floats 17 are moveably connected to each other by means of a cable, rope or flexible rod 19 extending through the center of each float 17. Sections of cable 19 can be attached together by means of bolts and eyes 20, shown in FIGS. 2 and 3. Disposed between each float 17 is a washer 16 having a channeled circumferenced edge as described hereinabove. For security, it is possible to have two or more cables (not shown) which can extend through the same aperture in float 17 or separate adjacent apertures (not shown).

Attached to the lateral side of floats 17 is a sheet 21 of preferably non-combustible material extending preferably from the top of float 17 to the weighted bottom thereof. The purpose of sheet 21 is to contain the oil and/or fire on one side of the floats, and hence the boom 10. Sheet 21 is preferably constructed of non-corrosive metal, such as stainless steel or the like, but can have the bottom portion thereof underneath the water line constructed of burlap or other flexible material permitting the flow-through of water. At the juncture points between the floats 17, the sheet 21 must have pleats, bends or folds 22 to provide for maximum flexibility in rough waters to permit the sheet to bend and flex with the movement of the bottom 10. In the case of sheet metal sheets 21, the pleats 22 would be appropriate hinges in the metal to provide for movement in either lateral direction.

While this invention has been described with respect to a preferred embodiment utilizing an off-shore oil well, it will be obvious to one skilled in the art that other substantial equivalents may be used and that the boom can be employed with all manner of oil spills and slicks. Accordingly, the inventive concept is defined only by the appended claims.

I claim:

1. An oil slick-retaining boom structure for disposition upon a body of water comprising in combination a plurality of floats moveably connected together through cable means extending through the interior of said floats, each float comprising in combination:

an elongate water-tight housing for floating in a body of water;

weights attached to one end of said housing for retaining said weighted end downward in the body of water;

a pair of apertures disposed respectively on either lateral side of said housing through which said connecting cable means extends; and sheet means interconnecting said floats to be held substantially perpendicular to the water surface said sheet means being constructed of metal and having hinged pleats disposed between adjacent floats to permit lateral movement of said sheet means.

2. A boom structure as set forth in claim 1, wherein said sheet means in constructed of metal for use above a water line when in use and of another material below said water line.

3. A boom structure as set forth in claim 1, wherein the floats are hexagonal with two ends of the hexagon being elongate.

4. A boom structure as set forth in claim 1, wherein the upper portion of said floats which extends upwardly from the surface of the water is constructed of metal.

5. A boom structure as set forth in claim 1, wherein said float housing is constructed entirely of light weight, oil and water-resistant metal.

6. A boom structure as set forth in claim 1, including washer means disposed adjacent said apertures.

7. A boom structure as set forth in claim 6, wherein the washer means are grooved about the outer circumference.

8. A boom structure as set forth in claim 7, including a plurality of elongate connecting members for attaching to said washer means for securing portions of the boom structure in parallel relationship to each other.

* * * * *